United States Patent
Albinski et al.

(10) Patent No.: US 12,409,894 B2
(45) Date of Patent: Sep. 9, 2025

(54) FRONT PILLAR STRUCTURE FOR A MOTOR VEHICLE, AND MOTOR VEHICLE

(71) Applicant: Bayerische Motoren Werke Aktiengesellschaft, Munich (DE)

(72) Inventors: Bartlomiej Albinski, Freising (DE); Alexander Boeck, Munich (DE); Nermin Kecalevic, Markt Schwaben (DE); Juergen Leschhorn, Geltendorf (DE); Marco Reisboeck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 373 days.

(21) Appl. No.: 18/011,669

(22) PCT Filed: Jun. 8, 2021

(86) PCT No.: PCT/EP2021/065278
§ 371 (c)(1),
(2) Date: Dec. 20, 2022

(87) PCT Pub. No.: WO2022/008147
PCT Pub. Date: Jan. 13, 2022

(65) Prior Publication Data
US 2023/0249750 A1     Aug. 10, 2023

(30) Foreign Application Priority Data
Jul. 8, 2020   (DE) .................... 10 2020 118 018.7

(51) Int. Cl.
*B62D 25/04* (2006.01)
*B62D 21/15* (2006.01)
(Continued)

(52) U.S. Cl.
CPC ........... *B62D 25/04* (2013.01); *B62D 21/152* (2013.01); *B62D 25/025* (2013.01); *B62D 27/023* (2013.01)

(58) Field of Classification Search
CPC .... B62D 25/04; B62D 25/025; B62D 27/023; B62D 21/15; B62D 21/152
(Continued)

(56) References Cited

U.S. PATENT DOCUMENTS 8,857,896 B2 * 10/2014 Pyun .................... B62D 25/082
                                                              296/193.06
9,452,787 B2 *  9/2016 Nakano ................ B62D 21/152
(Continued)

FOREIGN PATENT DOCUMENTS

DE   10 2013 209 097 A1   11/2014
DE   10 2014 114 102 A1    3/2016
(Continued)

OTHER PUBLICATIONS

International Search Report (PCT/ISA/210) issued in PCT Application No. PCT/EP2021/065278 dated Sep. 24, 2021 with English translation (six (6) pages).

*Primary Examiner* — Dennis H Pedder
(74) *Attorney, Agent, or Firm* — Crowell & Moring LLP

(57) ABSTRACT

A front pillar structure for a motor vehicle is manufactured in a shell type of construction, with a supporting carrier which reaches from a wheelhouse of the motor vehicle as far as a side sill of the front pillar structure, and with an outer shell which is connected to an outer side of the supporting carrier. The side sill includes a profile part which has a load-absorbing region formed in the transverse direction of the front pillar structure. The outer shell overlaps the load-
(Continued)

absorbing region in the vertical direction of the front pillar structure and is connected to the profile part below an apex of the load-absorbing region.

12 Claims, 4 Drawing Sheets

(51) Int. Cl.
*B62D 25/02* (2006.01)
*B62D 27/02* (2006.01)

(58) Field of Classification Search
USPC ............ 296/193.06, 209, 198, 187.09, 187.1
See application file for complete search history.

(56) References Cited

U.S. PATENT DOCUMENTS

| | | |
|---|---|---|
| 9,643,654 B2 | 5/2017 | Furusaki et al. |
| 2015/0344071 A1 | 12/2015 | Nakano et al. |
| 2016/0039466 A1 | 2/2016 | Yamamoto et al. |
| 2016/0068199 A1 | 3/2016 | Matthiessen et al. |
| 2017/0313357 A1 | 11/2017 | Narahara et al. |
| 2019/0210653 A1 | 7/2019 | Bokeloh et al. |

FOREIGN PATENT DOCUMENTS

| | | |
|---|---|---|
| DE | 10 2017 003 843 A1 | 11/2017 |
| DE | 10 2016 220 719 A1 | 4/2018 |
| EP | 2 979 957 A1 | 2/2016 |
| JP | 2011-136593 A | 7/2011 |
| WO | WO 2014/155538 A1 | 10/2014 |

* cited by examiner

FRONT PILLAR STRUCTURE FOR A MOTOR VEHICLE, AND MOTOR VEHICLE

BACKGROUND AND SUMMARY OF THE INVENTION

The invention relates to a front pillar structure for a motor vehicle, which front pillar structure is manufactured in a shell type of construction. The front pillar structure comprises a supporting carrier which extends from a wheelhouse of the motor vehicle as far as a side sill of the front pillar structure. An outer shell of the front pillar structure is connected to an outer side of the supporting carrier. The invention further relates to a motor vehicle having at least one such front pillar structure.

DE 10 2013 209 097 A1 discloses a subassembly for a vehicle body which comprises a sill, a roof frame, a hinge pillar, an outer shell and an inner shell. The hinge pillar, which is configured in the manner of an insert, in this case extends from a wheelhouse of a motor vehicle, which has the subassembly, as far as the sill, and the hinge pillar is formed from an extruded fiber composite material. In order to achieve a stable subassembly composite unit, the sill, the hinge pillar and the roof frame are enclosed by the outer shell and the inner shell.

In particular, in a motor vehicle which is configured as a battery-electric vehicle, attempts have been made to configure the front end of the vehicle to be relatively short, in order to achieve a high level of compactness with at the same time a high maneuverability of the motor vehicle. At the same time, however, it is to be ensured that the passenger compartment is designed to be as generous as possible. This means that relatively little installation space is available for a front pillar structure or A-pillar in the direction of the vehicle longitudinal axis. However, relatively high requirements are set for the A-pillar regarding crash behavior and stiffness. As a result, it represents a challenge to fulfill all of these requirements.

It is the object of the invention to provide a front pillar structure of the type mentioned in the introduction, an improved flux of force being able to be achieved thereby when the front pillar structure is under load, and to specify a motor vehicle having at least one such front pillar structure.

This object is achieved by a front pillar structure and by a motor vehicle according to the claimed invention.

A front pillar structure according to embodiments of the invention for a motor vehicle, which front pillar structure is manufactured in a shell type of construction, comprises a supporting carrier which extends from a wheelhouse of the motor vehicle as far as a side sill of the front pillar structure. An outer shell of the front pillar structure is connected to an outer side of the supporting carrier. The side sill comprises a profile part which has a load-absorbing region which is shaped in the transverse direction of the front pillar structure. In this case, the outer shell overlaps the load-absorbing region in the vertical direction of the front pillar structure and is connected to the profile part below an apex of the load-absorbing region.

The load-absorbing region, which is shaped in the transverse direction of the front pillar structure and thus in the motor vehicle is curved in a convex manner or is bulged toward the outer side of the motor vehicle, firstly ensures that in the region of the front pillar the side sill can effectively absorb loads which occur in the transverse direction of the front pillar structure and thus in the direction of the vehicle transverse axis. Secondly, the profile part also provides the side sill with a high degree of stiffness in the longitudinal direction of extension of the side sill and thus in the direction of the vehicle longitudinal axis when the front pillar structure or A-pillar structure is installed in the motor vehicle.

Since the supporting carrier of the front pillar structure extends from the wheelhouse of the motor vehicle as far as the side sill, a diagonal flux of force can additionally extend as far as the side sill via the supporting carrier. Thus loads can be effectively introduced into the side sill via the supporting carrier, the loads being able to be introduced into the supporting carrier from the front side of the supporting carrier, for example in the event of a front impact of the motor vehicle which has the front pillar structure.

Moreover, it is advantageous that in the direction of the vehicle vertical axis the outer shell overlaps or is superimposed on the load-absorbing region of the profile part and the outer shell additionally encompasses the profile part in the region of the apex, in the vertical direction of the front pillar structure and thus when the front pillar structure is installed in the motor vehicle. This is because in this manner a vertical flux of force can also be achieved via the outer shell which is configured in the manner of an upright A-pillar part. Thus loads acting in the direction of the vehicle vertical axis, for example introduced from a roof frame part of the front pillar structure, can also be introduced into the side sill via the outer shell.

As a result, an improved flux of force can be achieved by way of the front pillar structure when the front pillar structure is under load, namely in particular both the diagonal flux of force and the vertical flux of force.

Moreover, the profile part is reinforced by the outer shell in the transverse direction of the front pillar structure, wherein the outer shell or a lower partial region of the outer shell is clamped around the profile part of the side sill in the load-absorbing region from the outside. This is also advantageous regarding an improved resilience of the front pillar structure.

Preferably, a portion of the supporting carrier overlaps the apex of the load-absorbing region in the vertical direction of the front pillar structure. In this case, the outer shell is connected to the portion of the supporting carrier in the region of the apex. In this manner, the portion of the supporting carrier ensures a further reinforcement of the side sill in the region of the profile part.

Preferably, the side sill comprises a reinforcing part, the profile part being reinforced thereby in the load-absorbing region. Loads can be effectively absorbed by way of such a reinforcing part, both in the event of a front impact of the motor vehicle, which has the front pillar structure, and in the event of a side impact.

This is because the reinforcing part reinforces and protects the profile part of the side sill in the transverse direction of the front pillar structure and thus in the motor vehicle in the direction of the vehicle transverse axis. However, the reinforcing part also advantageously ensures a stiffening of the side sill in the region of the connection of the supporting carrier to the side sill. This stiffening is effective, in particular, in the case of a load introduced in the longitudinal direction of extension of the side sill.

Preferably, a portion of the supporting carrier is connected to the reinforcing part in the region of the apex. This is because the supporting carrier is supported in a very resilient manner on the reinforcing part of the side sill.

Additionally or alternatively, the outer shell can be connected to the reinforcing part below the apex in the vertical direction of the front pillar structure. Then the outer shell not only encompasses the profile part but also the reinforcing part in the region of the apex. This leads to a particularly robust design of the front pillar structure.

Preferably, the supporting carrier is supported on a front end region of the reinforcing part in the vertical direction of the front pillar structure. In this case, the supporting carrier is connected to the reinforcing part in the front end region of the reinforcing part. In this manner, a very resilient bond is achieved between the supporting carrier and the reinforcing part.

In particular, it can be provided that the outer shell is connected to an outer side of the front end region of the reinforcing part. This is because the outer shell also contributes to the reinforcement of the front pillar structure in this front end region of the reinforcing part.

Preferably, the front pillar structure comprises a roof frame part, wherein the outer shell extends from the profile part as far as the roof frame part and is connected to the roof frame part in the vertical direction of the front pillar structure. Thus a flux of force can be produced from the roof frame part to the side sill via the outer shell, for example when a load acts on the roof frame part of the front pillar structure in the vertical direction thereof. Whether the front pillar structure withstands a specific load in this direction can be tested, for example, in a roof crush test.

Preferably, the roof frame part in the motor vehicle adjoins a windshield of the motor vehicle at the side. Thus the windshield of the motor vehicle is enclosed at the side by the roof frame part, when the front pillar structure is a constituent part of a body shell of the motor vehicle.

Preferably, the front pillar structure comprises a pillar part which is connected to the supporting carrier with a lower end region, when viewed in the vertical direction of the front pillar structure, in a fastening region of the supporting carrier spaced apart from the side sill in the vertical direction. Such a pillar part of the front pillar structure ensures an advantageous stiffening of the front pillar structure in the vertical direction thereof.

Preferably, the roof frame part is connected to the pillar part. This leads to a resilient composite component of the front pillar structure which is manufactured in a shell type of construction.

Preferably, the front pillar structure comprises a stiffening element which is connected to the pillar part and to the supporting carrier. In this case, a portion of the stiffening element is arranged in an intermediate space which is configured between an upper end region of the pillar part and the supporting carrier, when viewed in the longitudinal direction of the side sill. Via such a stiffening element, loads introduced into the supporting carrier from the front end of the supporting carrier, which is arranged in the region of the wheelhouse, can be effectively diverted, on the one hand, into the roof frame part and, on the other hand, via the pillar part toward the side sill.

Preferably, the stiffening element has a partial region in which the stiffening element is connected to the outer shell. In this manner, the stiffening element of the front pillar structure is also reinforced by the outer shell of the front pillar structure.

It has also been shown to be advantageous if the outer shell is connected to an outer side of the pillar part. This is because in this manner a closure part for the internal components of the front pillar structure is formed by the outer shell. Such a closure part contributes to an increase in the resilience of the front pillar structure.

Preferably, an inner shell of the front pillar structure has a recess which is configured for installing a loudspeaker in the front pillar structure. In this case, a resonance space for the loudspeaker, which is configured in the front pillar structure, is defined on the underside by the supporting carrier. As a result, a particularly large resonance volume for the loudspeaker is provided inside the front pillar structure.

This is advantageous, in particular, when the loudspeaker is configured as a bass loudspeaker of a music system of the motor vehicle. This is because, in particular in a bass loudspeaker, it is advantageous if the resonance space provided for the loudspeaker is relatively large. The provision of a large resonance space, in particular, is additionally promoted by the resonance space extending along the supporting carrier which defines the resonance space on the underside.

Preferably, the side sill comprises a deformation element which is arranged inside a receiving space which is defined in some regions by the profile part. In the event of the motor vehicle, which has the front pillar structure, being involved in a side impact with an obstacle, such a deformation element can dissipate impact energy very effectively by deformation. Additionally, the deformation element serves for stiffening the profile part in the load-absorbing region.

It is advantageous if the deformation element has a plurality of chambers. This is because an effective absorption of impact energy by deformation is made possible by the deformation element having a low weight.

Preferably, the components of the front pillar structure are formed from steel. As a result, a particularly high degree of resilience of the front pillar structure can be achieved.

The motor vehicle according to embodiments of the invention has at least one front pillar structure according to embodiments of the invention. Preferably, both a left-hand A-pillar of the motor vehicle relative to a direction of travel, during forward travel of the motor vehicle, and a right-hand A-pillar of the motor vehicle, relative to this direction of travel, are provided in each case by a front pillar structure according to embodiments of the invention.

Preferably, the motor vehicle has an electrical energy storage device, electrical energy being able to be provided thereby for a drive device of the motor vehicle, which is configured for the propulsion of the motor vehicle. In particular, when the motor vehicle is configured as an electric vehicle or hybrid vehicle, the front pillar structure, which is associated with the improved flux of force, is particularly advantageous. This is because with such an electric vehicle or hybrid vehicle both the requirement of a short front end of the vehicle, with at the same time a long length of the passenger compartment of the motor vehicle, can be easily fulfilled by the front pillar structure, as well as the requirements regarding good crash behavior and a high level of stiffness of the front pillar structure.

The advantages and preferred embodiments described relative to the front pillar structure according to embodiments of the invention also apply to the motor vehicle according to embodiments of the invention and vice versa.

Further features of the invention emerge from the claims, the figures and the description of the figures. The features and combinations of features mentioned above in the description and the features and combinations of features mentioned hereinafter in the description of the figures and/or shown individually in the figures are not only able to be used in the respectively specified combination but also in other combinations or individually.

The invention is now explained in more detail with reference to a preferred exemplary embodiment and with reference to the drawings.

DETAILED DESCRIPTION OF THE DRAWINGS

Figure 1:
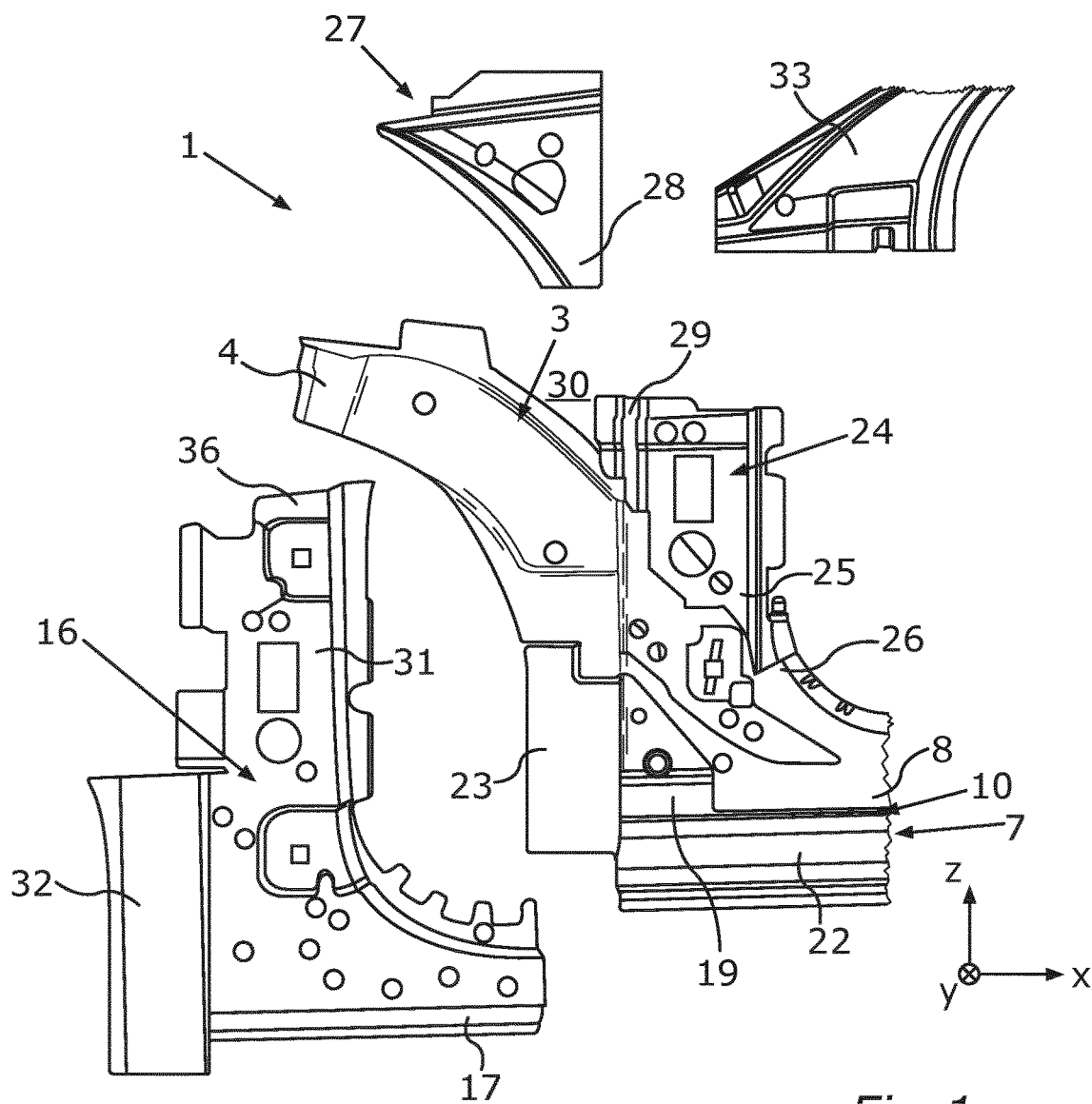
FIG. 1 shows in a schematic exploded view components of a front pillar structure for a motor vehicle.
Figure 2:
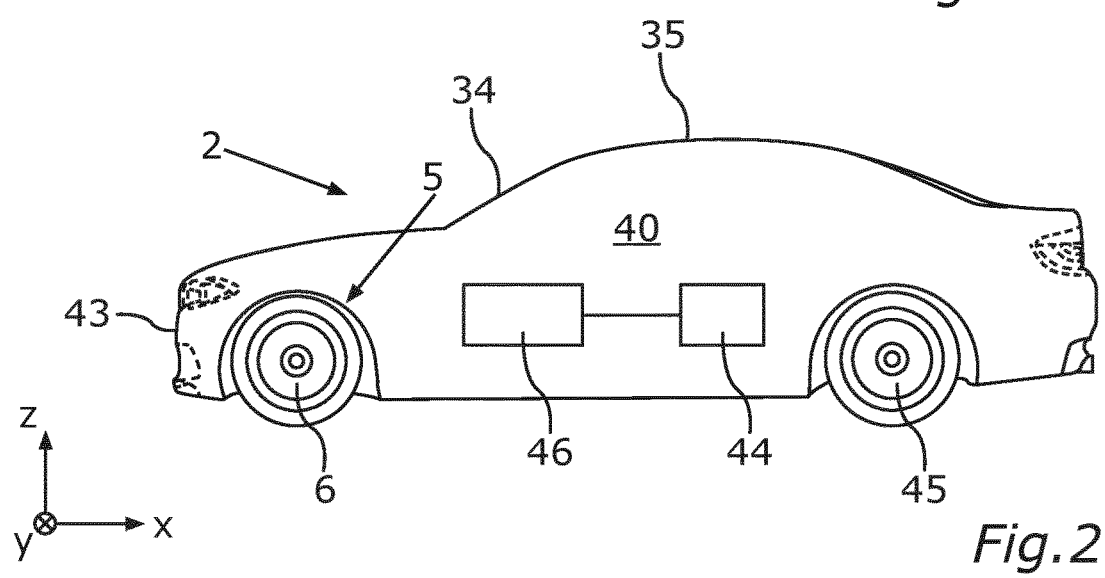
FIG. 2 shows highly schematically the motor vehicle which is configured as an electric vehicle and which has the front pillar structure according to FIG. 1.

Components of a front pillar structure 1 for a motor vehicle 2, shown highly schematically in FIG. 2, are shown in a side view in FIG. 1. The front pillar structure 1 which is manufactured in a shell type construction, an A-pillar of the motor vehicle 2 being formed thereby, comprises a diagonally running supporting carrier 3. With this diagonal orientation of the supporting carrier 3, a front end 4 of the supporting carrier 3 is arranged in the motor vehicle 2 in the region of a wheelhouse 5 for one of the front wheels 6 of the motor vehicle 2 (see FIG. 2).

In the longitudinal direction of the front pillar structure 1 and thus in the installed position of the front pillar structure 1 in the motor vehicle 2, the supporting carrier 3 extends as far as a front end region of a side sill 7 of the motor vehicle 2, in the direction of the vehicle longitudinal axis x. Thus the supporting carrier 3 can also be denoted as the wheelhouse supporting carrier which, starting from an upper region of the wheelhouse 5 in the direction of the vehicle longitudinal axis x, continues to the side sill 7.

The vehicle longitudinal axis x and the vehicle vertical axis z and the vehicle transverse axis y, for example, are illustrated in FIG. 1 by a coordinate system.

A diagonal flux of force can be achieved inside the front pillar structure 1 via the supporting carrier 3 which extends, starting from the side sill 7, to the front in the direction of the vehicle longitudinal axis x and at the same time upwardly in the direction of the vehicle vertical axis z and thus in the diagonal direction.

Figure 3:
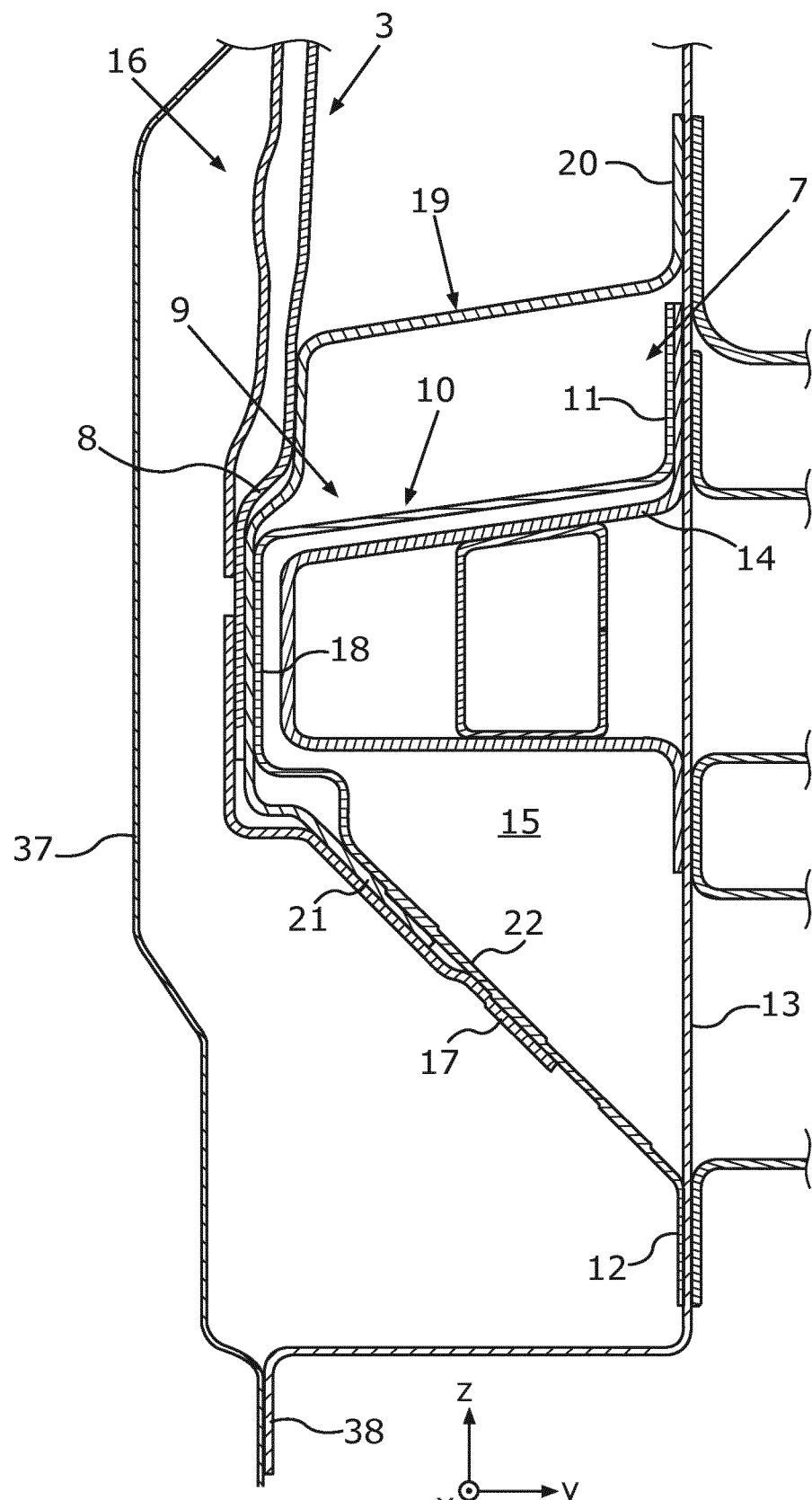
FIG. 3 shows a sectional view of the front pillar structure according to FIG. 1 in the transverse direction of the motor vehicle in the region of the side sill.

The construction of the side sill 7 in the region of a rear, lower portion 8 of the supporting carrier 3 can be clearly identified, in particular, from the sectional view of the front pillar structure 1 in FIG. 3. Accordingly, the side sill 7 comprises a profile part 9 which in the present case is configured in the manner of a that profile. This profile part 9 has a load-absorbing region 10 which is shaped or bulged toward the vehicle outer side in the transverse direction of the front pillar structure 1 and thus in the direction of the vehicle transverse axis y.

The profile part 9 is connected to further components of the front pillar structure 1 via the respective flanges 11, 12 of the profile part 9. Thus the lower flange 12, in the vertical direction of the front pillar structure 1 and thus in the direction of the vehicle vertical axis z, is connected to a wall part 13 of the front pillar structure 1 which extends in the region of the profile part 9 in the direction of the vehicle vertical axis z.

Accordingly, the upper flange 11, in the vertical direction of the front pillar structure 1 and thus in the direction of the vehicle vertical axis z, is connected in the present case to a fastening flange of an (optional) deformation element 14, the deformation element 14 being secured by the fastening flange to the wall part 13. The deformation element 14, which is preferably provided, is arranged in the present case in a receiving space 15 which is defined upwardly and downwardly and toward the vehicle outer side by the profile part 9. The deformation element 14 can have a plurality of chambers, as shown by way of example in the present case.

According to FIG. 1, the front pillar structure 1 comprises an outer shell 16 which is shown in FIG. 1 in a state not yet connected to the remaining components of the front pillar structure 1. Relative thereto it can be seen in FIG. 3 that the outer shell 16 overlaps or is superimposed on the load-absorbing region 10 of the profile part 9, in the vertical direction of the front pillar structure 1 and thus in the direction of the vehicle vertical axis z. In this case, a lower end region 17 of the outer shell 16 is connected to the profile part 9 below an apex 18 of the load-absorbing region 10. In the present case, the profile part 9 is spaced furthest apart from the wall part 13 in the region of the apex 18.

It can also be seen in FIG. 3 that the lower portion 8 of the supporting carrier 3 overlaps the apex 18 of the load-absorbing region 10 in the vertical direction of the front pillar structure 1. Moreover, the outer shell 16 is connected in the region of the apex 18 to the lower portion 8 of the supporting carrier 3.

In the present case, a partially encompassing attachment of the supporting carrier 3 to the side sill 7 is implemented. Preferably, it is provided that the side sill 7 has a reinforcing part 19 in its front region, the supporting carrier 3 extending as far as this front region in the direction of the vehicle longitudinal axis x and thus in the longitudinal direction of extension of the side sill 7. In the present case, the partially encompassing attachment of the supporting carrier 3 to the side sill 7 is implemented in the region of this reinforcing part 19.

The profile part 9 is reinforced, in particular, in the load-absorbing region 10 by the reinforcing part 19 which is shown in section in FIG. 3 and which can also be partially seen in a side view from the outside in FIG. 1. This is because in the present case the reinforcing part 19 encompasses the apex 18 of the load-absorbing region 10.

In this case, an upper fastening flange 20 of the reinforcing part 19 is connected to the wall part 13. Accordingly, a lower end region 21 of the reinforcing part 19, which is connected to the profile part 9, is arranged between a portion of the outer shell 16 and a limb 22 of the profile part 9 which in the present case is oriented in an inclined manner. Thus in the end region 21, firstly the reinforcing part 19 is connected to the profile part 9 of the side sill 7 and secondly the outer shell 16 is connected to the reinforcing part 19.

Moreover, in the present case according to FIG. 3 the lower portion 8 of the supporting carrier 3 is connected to the reinforcing part 19, on the one hand, in the region of the apex 18 and, on the other hand, above the apex 18.

It can also be seen in FIG. 1 that the supporting carrier 3 is supported on a front end region 23 of the reinforcing part 19 in the vertical direction of the front pillar structure 1 and thus in the direction of the vehicle vertical axis z. In this case, the supporting carrier 3 is connected to the reinforcing part 19 in the front end region 23 of the reinforcing part 19.

According to FIG. 1, the front pillar structure 1 also comprises a pillar part 24 which is connected to the supporting carrier 3 by a lower end region 25 in a fastening region 26 of the supporting carrier 3, when viewed in the vertical direction of the front pillar structure 1. This fastening region 26 of the supporting carrier 3 is spaced apart from the side sill 7 in the vertical direction of the front pillar structure 1. The pillar part 24 is thus attached to the supporting carrier 3 or brought up toward the supporting carrier 3 in the vertical direction of the front pillar structure 1.

A stiffening element 27 of the front pillar structure 1 is also shown in FIG. 1, the stiffening element being connected, on the one hand, to the pillar part 24 and, on the other hand, to the supporting carrier 3 in the assembled state of the front pillar structure 1. The stiffening element 27 comprises a lower portion 28 in which the stiffening element 27 tapers.

In the assembled state of the front pillar structure 1, the lower portion 28 of the stiffening element 27 is arranged in an intermediate space 30 which, when viewed in the longitudinal direction of the side sill 7, is configured between an upper end region 29 of the pillar part 24 and the supporting carrier 3.

It can also be seen in FIG. 1 that the outer shell 16 has a first connecting region 31 in which the outer shell 16 is connected to an outer side of the pillar part 24. Moreover, in the present case, the outer shell 16 has a further connecting region 32 in which the outer shell 16 is connected to the front end region 23 of the reinforcing part 19.

A lower portion of a roof frame part 33 of the front pillar structure 1 is also shown in FIG. 1, in the motor vehicle 2 the lower portion of the roof frame part adjoining a windshield 34 (see FIG. 2) of the motor vehicle 2 at the side and extending toward a roof 35 of the motor vehicle 2. This roof frame part 33 is connected, on the one hand, to the pillar part 24 and, on the other hand, to the stiffening element 27.

Moreover, in the present case, an upper end region 36 of the outer shell 16 is connected to the roof frame part 33. As a result, the outer shell 16 extends in the vertical direction of the front pillar structure 1 and thus in the direction of the vehicle vertical axis z from the roof frame part 33 downwardly as far as the side sill 7.

As the outer shell 16 also overlaps the pillar part 24 toward the outer side of the motor vehicle 2, in the front end region of the side sill 7 both the supporting carrier 3 and the pillar part 24 are overlapped or enclosed by this outer shell 16 toward the vehicle outer side, and the outer shell 16 closes the aforementioned components of the front pillar structure 1 toward the outer side.

It can also be seen in FIG. 3 that in the motor vehicle 2 the components of the front pillar structure 1 toward the vehicle outer side shown in FIG. 1 are concealed by an outer panel part 37. In this case, as shown by way of example in FIG. 3, the outer panel part 37 can be secured to a flange 38 which is configured integrally with the wall part 13. In the present case, the flange 38 is arranged offset slightly toward the vehicle outer side, in the direction of the vehicle transverse axis y relative to the apex 18 of the profile part 9.

Figure 4:
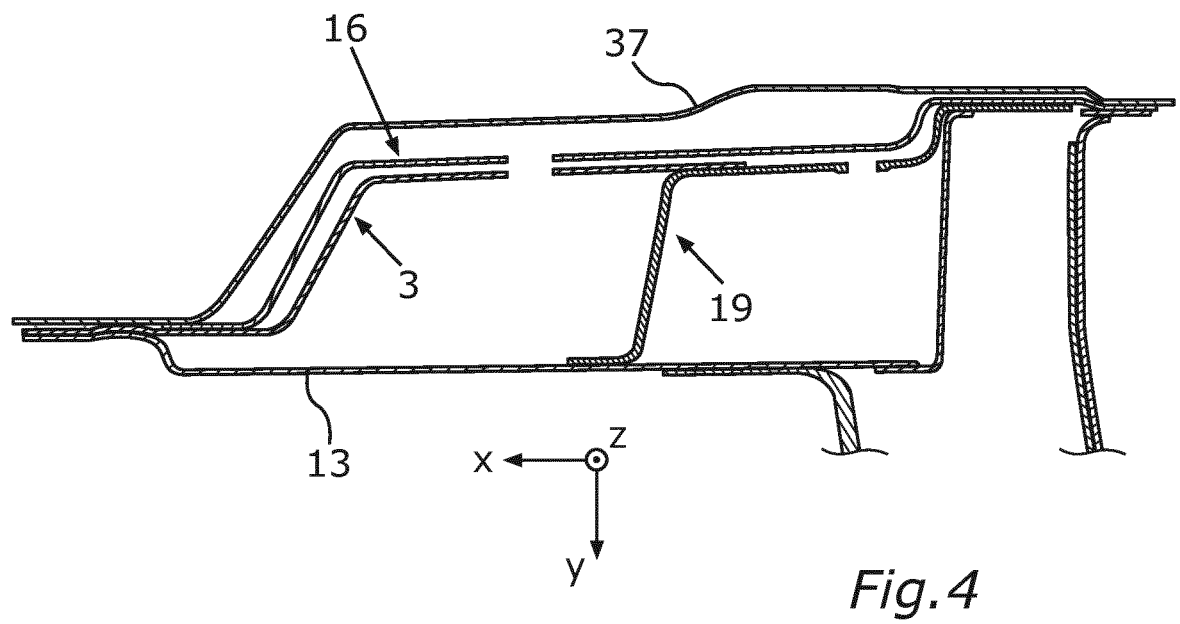
FIG. 4 shows a further sectional view of the front pillar structure according to FIG. 1 in a horizontal cutting plane.

It can also be clearly seen from the sectional view of the front pillar structure 1 according to FIG. 4 how the outer shell 16 overlaps the supporting carrier 3 level with the reinforcing part 19 toward the vehicle outer side. The fastening of the supporting carrier 3 to the reinforcing part 19 and the cladding of the front pillar structure 1 toward the vehicle outer side by the outer panel part 37 can also be seen from the sectional view in FIG. 4.

Figure 5:
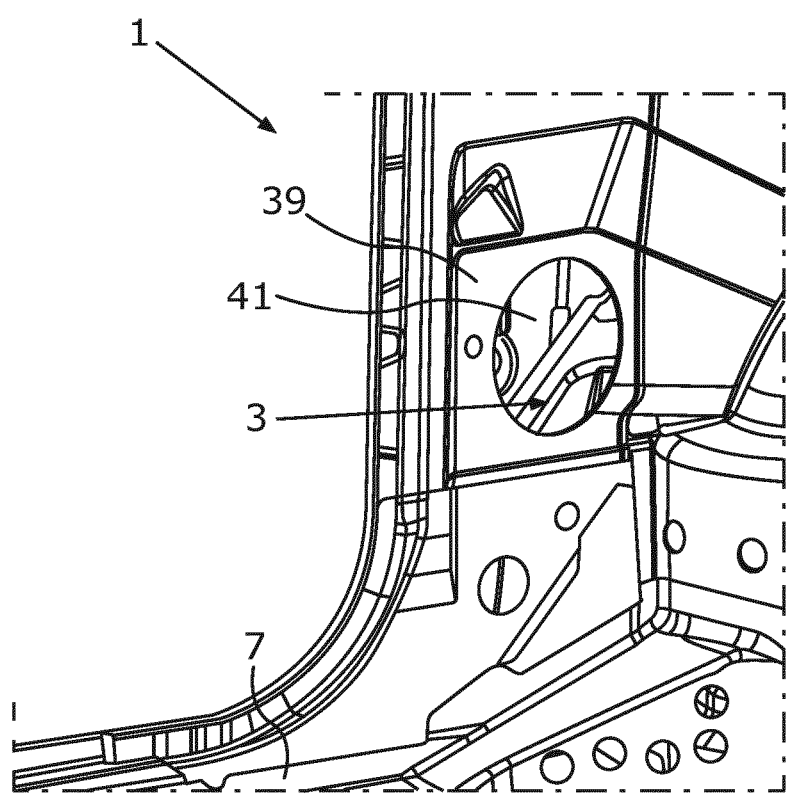
FIG. 5 shows in detail the front pillar structure according to FIG. 1 in a perspective view of an inner shell of the front pillar structure.

An inner shell 39 of the front pillar structure 1 is shown in detail in FIG. 5. The inner shell 39 conceals the pillar part 24 (see FIG. 1) toward a passenger compartment 40 (see FIG. 2) or a passenger space of the motor vehicle 2.

It can also be identified from FIG. 5 that a recess 41, in which a loudspeaker of the motor vehicle 2 can be installed, is configured in the inner shell 39. The loudspeaker can be configured, in particular, as a bass loudspeaker. Due to the recess 41, a part of the supporting carrier 3 can also be identified in FIG. 5 through this opening which is configured in the inner shell 39. The supporting carrier 3 is also concealed toward the passenger compartment 40 in some regions by the inner shell 39.

Figure 6:
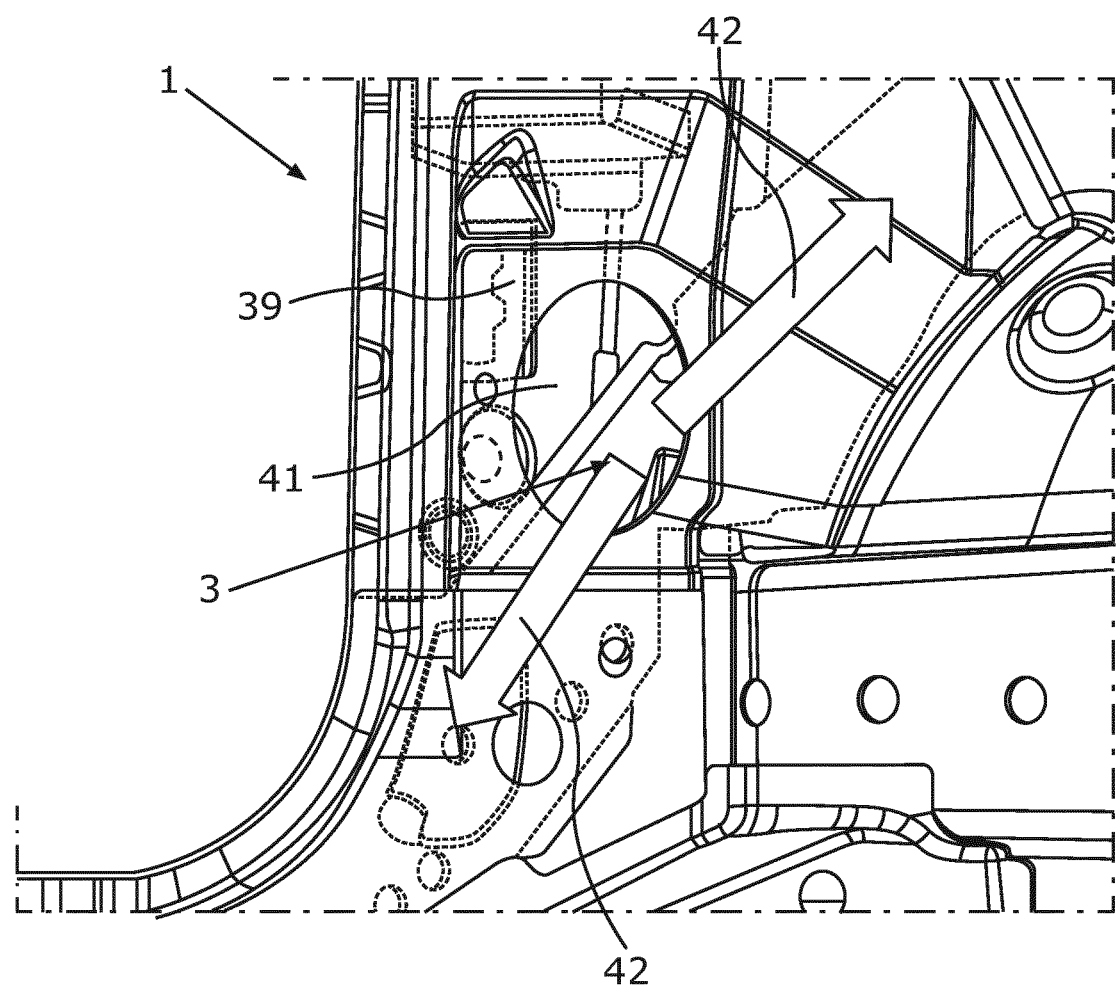
FIG. 6 shows a further perspective view according to FIG. 5 in which an extension of a resonance space for a bass loudspeaker of the motor vehicle which can be attached to the inner shell is illustrated by arrows.

The path of the supporting carrier 3, on the one hand, in the region of the recess 41 and, on the other hand, in regions of the front pillar structure 1 adjoining the recess 41 can be identified from FIG. 6. In this case, two arrows 42 illustrate a volume which is available on the upper face of the supporting carrier 3 inside the front pillar structure 1 as a resonance volume or resonance space for the bass loudspeaker.

Due to the preferably provided attachment of the loudspeaker, in particular the bass loudspeaker, on the inner shell 39 of the front pillar structure 1, in which the loudspeaker is inserted into the recess 41, a very large resonance space for this loudspeaker is provided in the region of the front pillar structure 1. This is because the resonance space extends, on the one hand, in the vicinity of the side sill 7 and, on the other hand, toward a front 43 (see FIG. 2) of the motor vehicle 2 approximately as far as the wheelhouse 5.

According to FIG. 2 the motor vehicle 2 can be configured, in particular, as an electric vehicle which has a drive device, for example in the form of at least one electric motor 44. The front wheels 6 and/or rear wheels 45 of the motor vehicle 2 can be driven by way of the at least one electric motor 44. An electrical energy storage device 46 of the motor vehicle 2, which supplies the at least one electric motor 44 with electrical energy, is also shown schematically in FIG. 2.

In FIG. 2 the at least one electric motor 44 and the electrical energy storage device 46 are shown only schematically and not corresponding to their actual arrangement in the motor vehicle 2.

Preferably, the electrical energy storage device 46, which is preferably configured as a high voltage storage device and thus for providing a voltage of more than 60 volts and, in particular, up to several hundred volts, is arranged below a floor of the passenger compartment 40 or the passenger space, wherein the passenger compartment 40 is defined in the direction of the underside thereof by the floor.

LIST OF REFERENCE SIGNS

1 Front pillar structure
2 Motor vehicle
3 Supporting carrier
4 End
5 Wheelhouse
6 Front wheel
7 Side sill
8 Portion
9 Profile part
10 Load-absorbing region
11 Flange
12 Flange
13 Wall part
14 Deformation element 15 Receiving space
16 Outer shell
17 End region
18 Apex
19 Reinforcing part
20 Fastening flange
21 End region
22 Limb
23 End region
24 Pillar part
25 End region
26 Fastening region
27 Stiffening element
28 Portion
29 End region
30 Intermediate space
31 Connecting region
32 Connecting region
33 Roof frame part
34 Windshield
35 Roof
36 End region
37 Outer panel part
38 Flange
39 Inner shell
40 Passenger compartment
41 Recess
42 Arrows
43 Front
44 Electric motor
45 Rear wheel
46 Energy storage device
x Vehicle longitudinal axis
y Vehicle transverse axis
z Vehicle vertical axis

The invention claimed is:

1. A front pillar structure for a motor vehicle, wherein the front pillar structure is manufactured in a shell type of construction, the front pillar structure comprising:
a supporting carrier which extends from a wheelhouse of the motor vehicle as far as a side sill of the front pillar structure, and
an outer shell which is connected to an outer side of the supporting carrier, wherein:
the side sill comprises a profile part which has a load-absorbing region which is shaped in a transverse direction of the front pillar structure,
the outer shell overlaps the load-absorbing region in a vertical direction of the front pillar structure and is connected to the profile part below an apex of the load-absorbing region,
a portion of the supporting carrier overlaps the apex of the load-absorbing region in the vertical direction of the front pillar structure,
the outer shell is connected to the portion of the supporting carrier in a region of the apex, and
the front pillar structure is covered toward an outside of the motor vehicle by an outer paneling part that also covers the outer shell.

2. The front pillar structure according to claim 1, wherein:
the side sill comprises a reinforcing part, and
the profile part is reinforced by the reinforcing part in the load-absorbing region.

3. The front pillar structure according to claim 2, wherein at least one of:
a portion of the supporting carrier is connected to the reinforcing part in a region of the apex, or
the outer shell is connected to the reinforcing part below the apex in the vertical direction of the front pillar part structure.

4. The front pillar structure according to claim 3, wherein:
the supporting carrier is supported on a front end region of the reinforcing part in the vertical direction of the front pillar structure, and
the supporting carrier is connected to the reinforcing part in the front end region of the reinforcing part.

5. The front pillar structure according to claim 1, further comprising:
a roof frame part, wherein the outer shell extends from the profile part as far as the roof frame part and is connected to the roof frame part in the vertical direction of the front pillar structure.

6. The front pillar structure according to claim 1, further comprising:
a pillar part which is connected to the supporting carrier with a lower end region, when viewed in the vertical direction of the front pillar structure, in a fastening region of the supporting carrier spaced apart from the side sill in the vertical direction.

7. The front pillar structure according to claim 6, further comprising:
a stiffening element which has a partial region which is connected to the outer shell, and which is connected to the pillar part and to the supporting carrier,
wherein a portion of the stiffening element is arranged in an intermediate space which is configured between an upper end region of the pillar part and the supporting carrier, when viewed in a longitudinal direction of the side sill.

8. The front pillar structure according to claim 1, wherein:
an inner shell of the front pillar structure has a recess which is configured for installing a loudspeaker in the front pillar structure, and
a resonance space for the loudspeaker, which is configured in the front pillar structure, is defined on an underside by the supporting carrier.

9. The front pillar structure according to claim 1, wherein:
the side sill comprises a deformation element.

10. The front pillar structure according to claim 9, wherein the deformation element has a plurality of chambers and is arranged inside a receiving space which is defined in some regions by the profile part.

11. A motor vehicle comprising:
the front pillar structure according to claim 1, and
an electrical energy storage device,
wherein the electrical energy storage device is configured to provide electrical energy for a drive device of the motor vehicle, and the drive device is configured for propulsion of the motor vehicle.

12. A front pillar structure for a motor vehicle, wherein the front pillar structure is manufactured in a shell type of construction, the front pillar structure comprising:
a supporting carrier which extends from a wheelhouse of the motor vehicle as far as a side sill of the front pillar structure,
an outer shell which is connected to an outer side of the supporting carrier,
a pillar part which is connected to the supporting carrier with a lower end region, when viewed in the vertical direction of the front pillar structure, in a fastening region of the supporting carrier spaced apart from the side sill in the vertical direction, and a stiffening element which has a partial region which is connected to the outer shell, and which is connected to the pillar part and to the supporting carrier, wherein:

the side sill comprises a profile part which has a load-absorbing region which is shaped in a transverse direction of the front pillar structure, the outer shell overlaps the load-absorbing region in a vertical direction of the front pillar structure and is connected to the profile part below an apex of the load-absorbing region, and a portion of the stiffening element is arranged in an intermediate space which is configured between an upper end region of the pillar part and the supporting carrier, when viewed in a longitudinal direction of the side sill.

* * * * *